United States Patent
Box et al.

(10) Patent No.: US 11,578,714 B2
(45) Date of Patent: Feb. 14, 2023

(54) PNEUMATIC MUFFLER FOR DESICCANT AIR DRYER

(71) Applicant: WINSUPPLY 0207 ACQ CO., Irving, TX (US)

(72) Inventors: Weymon Kevin Box, Rockwall, TX (US); Michael Ballard Sheppard, Crandall, TX (US)

(73) Assignee: Winsupply 0207 ACQ CO., Irving, TX (US)

( * ) Notice: Subject to any disclaimer, the term of this patent is extended or adjusted under 35 U.S.C. 154(b) by 629 days.

(21) Appl. No.: 16/699,924

(22) Filed: Dec. 2, 2019

(65) Prior Publication Data

US 2021/0164461 A1    Jun. 3, 2021

(51) Int. Cl.
  *F04B 39/00*  (2006.01)
  *B01D 53/26*  (2006.01)
  *G10K 11/162* (2006.01)
  *B01D 53/04*  (2006.01)

(52) U.S. Cl.
  CPC ...... *F04B 39/0061* (2013.01); *B01D 53/0407* (2013.01); *B01D 53/261* (2013.01); *G10K 11/162* (2013.01); *B01D 2257/80* (2013.01); *B01D 2259/40086* (2013.01)

(58) Field of Classification Search
  CPC ............ F04B 39/0061; B01D 53/0407; B01D 53/261; B01D 2257/80; B01D 2259/40086; G10K 11/162
  USPC .................................................. 181/230, 224
  See application file for complete search history.

(56) References Cited

U.S. PATENT DOCUMENTS

| | | | |
|---|---|---|---|
| 3,715,010 A * | 2/1973 | Gibel ..................... | F01N 1/06 181/267 |
| 4,134,472 A * | 1/1979 | Trainor .............. | B01D 46/2411 181/243 |
| 5,767,459 A * | 6/1998 | Sell ......................... | F01N 1/082 181/258 |
| 6,053,277 A | 4/2000 | Walker et al. | |
| 7,000,332 B1 * | 2/2006 | Fresch ................. | B01D 53/261 95/122 |
| 7,216,739 B2 * | 5/2007 | Sterling ................. | B23B 47/00 181/252 |
| 9,017,460 B2 | 4/2015 | Minato et al. | |
| 9,587,765 B2 * | 3/2017 | Lin ................... | F16L 55/02718 |
| 10,249,280 B1 * | 4/2019 | Blake ................ | G10K 11/161 |
| 10,583,548 B2 * | 3/2020 | Sun ..................... | G10K 11/002 |
| 10,717,179 B2 * | 7/2020 | Koenig .................. | B25C 1/06 |

(Continued)

FOREIGN PATENT DOCUMENTS

| CN | 217029059 U | * | 7/2022 |
|---|---|---|---|
| EP | 0537483 B1 | | 11/1995 |

(Continued)

*Primary Examiner* — Forrest M Phillips
(74) *Attorney, Agent, or Firm* — Clark Hill PLC

(57) ABSTRACT

A novel design for desiccant air dryer pneumatic mufflers includes a core comprising a perforated inner tube with baffles attached to the outside surface of the inner tube. The inner tube is positioned in the interior of an outer tube, and a cap is positioned on one end of both tubes. The interior portion of the cap is solid so that it blocks the flow of air at the end of the inner tube, forcing the air to flow through the perforations in the inner tube and into the outer tube. The perimeter of the cap is perforated so that the air exits the muffler.

17 Claims, 6 Drawing Sheets

(56) References Cited

U.S. PATENT DOCUMENTS 11,176,921 B2 * 11/2021 Lee ..................... G10K 11/162
2004/0126247 A1    7/2004 Broser et al.

FOREIGN PATENT DOCUMENTS

| JP | 2002013407 A | 1/2002 |
| JP | 5155044 B2 | 2/2013 |
| JP | 2013107038 A | 6/2013 |
| JP | 5464687 B2 | 4/2014 |

* cited by examiner

US 11,578,714 B2

PNEUMATIC MUFFLER FOR DESICCANT AIR DRYER

RELATED APPLICATIONS

None.

BACKGROUND OF THE INVENTION

Compressed air systems are commonly used in a number of industrial applications. During the course of such industrial operations, the compressed air may become contaminated with water vapor. If left untreated, the water vapor may condense into the various components downstream from the compressor. In order to prevent such condensation, which may corrode components or otherwise interfere with the industrial application, an air dryer removes the water vapor from the compressed air.

In a regenerative desiccant air dryer, the compressed air passes through a desiccant material which results in the removal of moisture from the compressed air. Over time, the desiccant material becomes more and more saturated, leaving it unable to remove moisture effectively, and the desiccant material must be "regenerated." During the regeneration process, the desiccant vessel is isolated from the pressurized line and a "blow down" valve is opened to release the pressurized air in the desiccant vessel through the saturated desiccant and out an exhaust system. The desiccant is then treated to remove the moisture from the desiccant. Once regenerated, the desiccant vessel is reconnected to the pressurized line and continues to remove the moisture from the compressed air. Depending on the air dryer equipment used and the level of air dryness required for the particular application, the regeneration process may occur every two to eight minutes; the release of pressurized air through the exhaust may take about fifteen seconds.

When the blow down valve is opened, the release of compressed air creates significant aerodynamic noise which may cause ear damage to anyone in the vicinity of the dryer. To lessen the effect of the noise, dryer systems often include pneumatic mufflers to reduce the noise level. Known pneumatic mufflers may contain fiberglass, treated paper, wire mesh, or other packing materials which divide and slow the air flow, which in turn reduces the aerodynamic noise. However, over time, the packing material becomes blocked with oil and dirt which obstructs the air flow through the muffler and creates a back pressure on the equipment, which may lead to greater noise and potentially to catastrophic failure of the device. Further, because of the regular exposure to blasts of air, at pressures of 230 psi or more, pneumatic mufflers are subject to loss of structural integrity over time. Further, if there is a malfunction in the regeneration process, the desiccant may turn to a sludge-like form; if the desiccant in this form is subsequently blown into the muffler during regeneration, the muffler will become unusable. As such, even in the best of working environments, pneumatic mufflers must be replaced on a regular basis, and over time, the cost and labor required for replacement of the mufflers can become substantial.

What is needed, therefore, is a regenerative desiccant air dryer pneumatic muffler which provides suitable noise dampening capabilities during blow down without the associated cost and labor required for repair and/or replacement.

SUMMARY OF THE INVENTION

Like conventional regenerative desiccant air dryer pneumatic mufflers, embodiments of the present invention slow and divide the air flow, reducing the sound to levels that are within the guidelines of the National Institute for Occupational Safety and Health (NIOSH), the Occupational Safety and Health Administration (OSHA), the Centers for Disease Control and Prevention (CDC), and other governmental agencies and private workplace safety organizations. Unlike conventional mufflers, however, embodiments of the present invention comprise all steel components instead of the traditional noise-dampening packing material. As such, embodiments of the present invention contain no packing material that may become blocked by oil or dirt thus obviating the need for replacement of the muffler. Further, because of the all-steel casing, embodiments of the present invention are sturdier, allowing them to maintain structural integrity despite regular exposure to high pressure blasts of compressed air. Further, in the unlikely event of a desiccant failure, because embodiments of the present invention contain no packing material, they can be dismantled, washed, and reassembled without the need for replacement.

BRIEF DESCRIPTION OF THE DRAWINGS

FIG. 4a is an external side view of the inner tube in an embodiment of the present invention and FIG. 4b is a close-up view of FIG. 4a.

DETAILED DESCRIPTION OF THE INVENTION

The present invention may be implemented in a variety of embodiments, including a disclosed specific embodiment which provides sufficient details so as to enable a person of ordinary skill to make and use the invention without extensive experimentation, as well as variations on this specific embodiment that may prove beneficial for certain applications and configurations. In describing the specific embodiment and variations, as one of ordinary skill will understand, the inventive muffler may ultimately be installed on an air dryer such that the actual airflow may be upward, downward, or side to side. Thus while the embodiments may described the relative positions of various components using the terms "top" and "bottom," these terms will be understood to be relative to an orientation where the air enters the muffler at the "bottom" and exits the muffler at the "top" as suggested by FIG. 1; use of such relative terminology does not imply any limitation as to the orientation of the muffler as ultimately installed on an air dryer.

Features Common to All Embodiments

Figure 1:
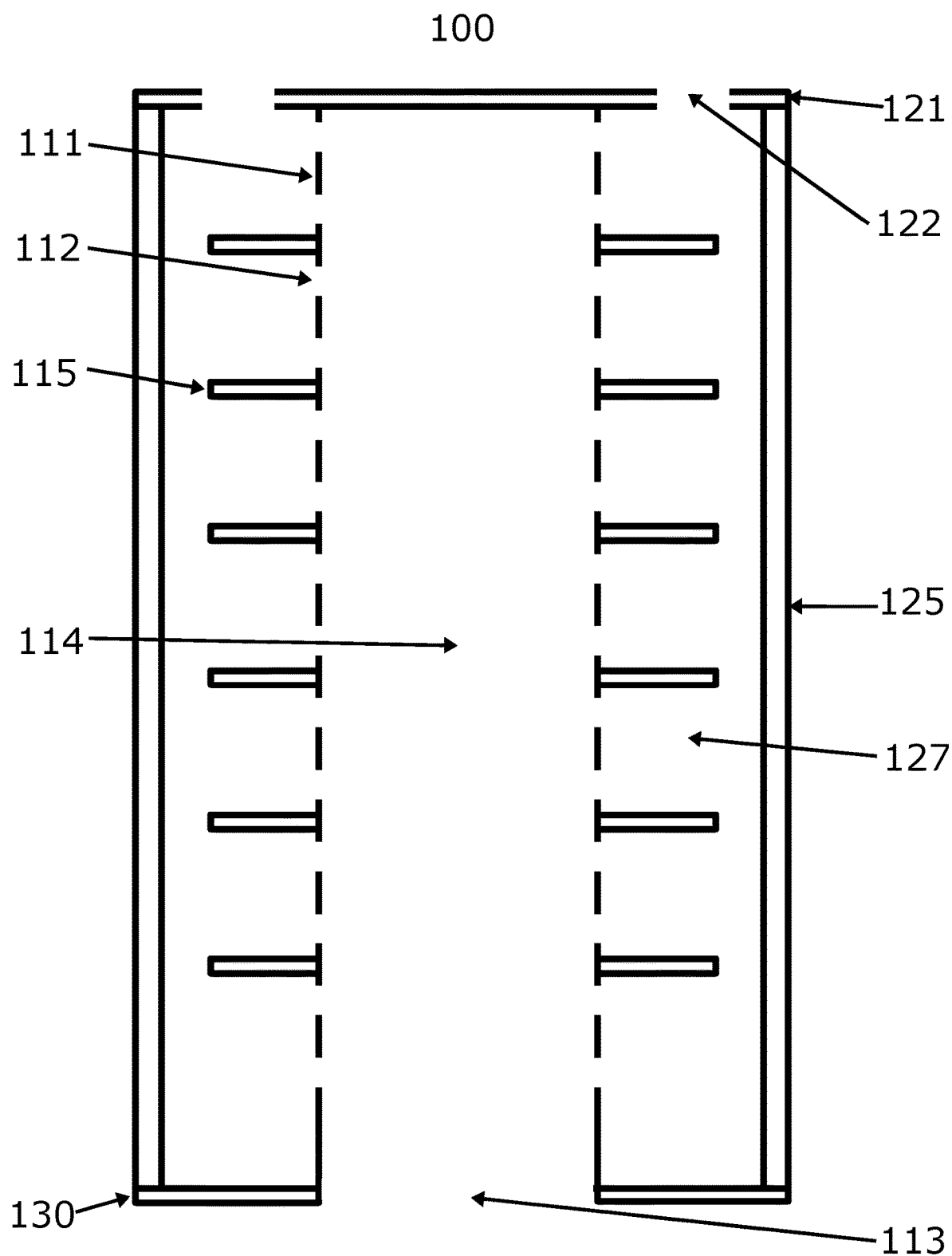
FIG. 1 is a cutaway view of an embodiment of the present invention.

As shown in FIG. 1, embodiments of muffler 100 comprise an inner tube in having a plurality of tube holes 112 and a plurality of baffles 115 on the outside of inner tube 111. Inner tube 111 is positioned inside of an outer tube 125 which is partially closed on the top end by a cap 121. Cap 121 has a plurality of cap holes 122 and is secured to outer tube 125. On the bottom end of outer tube 125, a base 130 (which may be an integrated part of muffler 100 or may be part of the connection to air dryer 160 (not shown in FIG. 1) has an opening 113 into inner tube 111 in its center.

During a blow down cycle, compressed air enters muffler 100 at opening 113 and passes into a core airflow chamber 114. The air then travels out of core airflow chamber 114 through the plurality of tube holes 112, entering casing airflow chamber 127 which lies between inner tube 111 and outer tube 125. As the compressed air passes through casing airflow chamber 127, it is slowed by the plurality of baffles 115, and then passes out of muffler 100 through the plurality of cap holes 122. The combination of dividing the airflow into multiple streams and slowing the air flow as it passes through muffler 100 decreases the level of aerodynamic noise.

A Preferred Embodiment of the Present Invention

Figure 2:
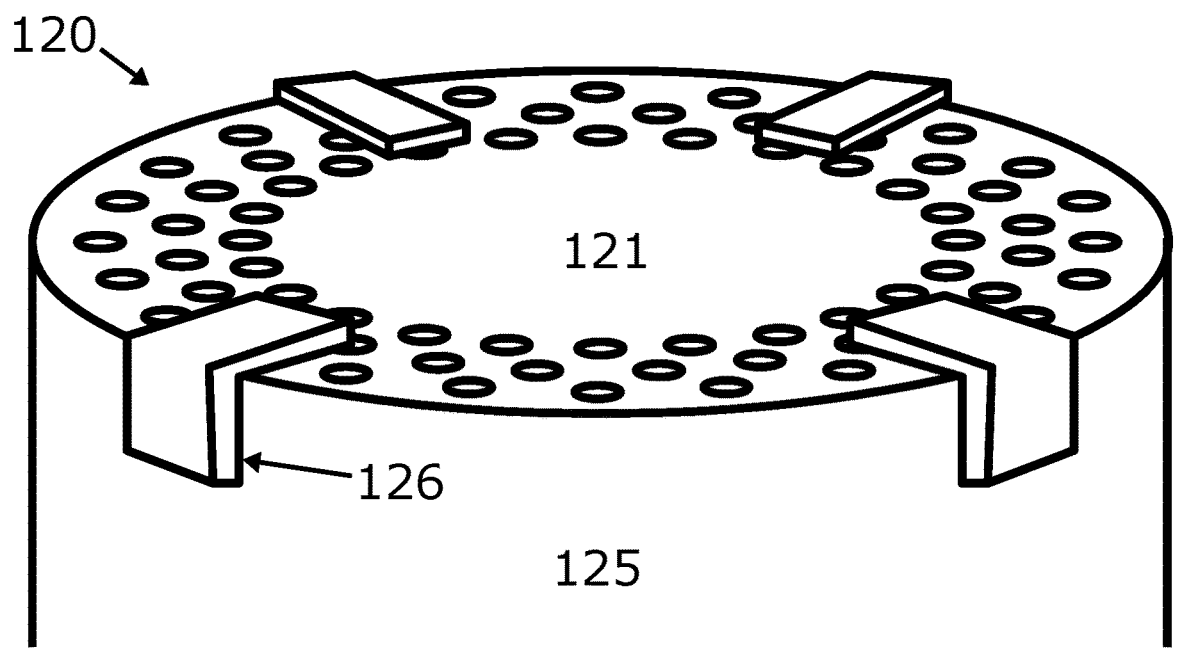
FIG. 2 is an external angled view of the top of the assembled casing in an embodiment of the present invention.
Figure 3:
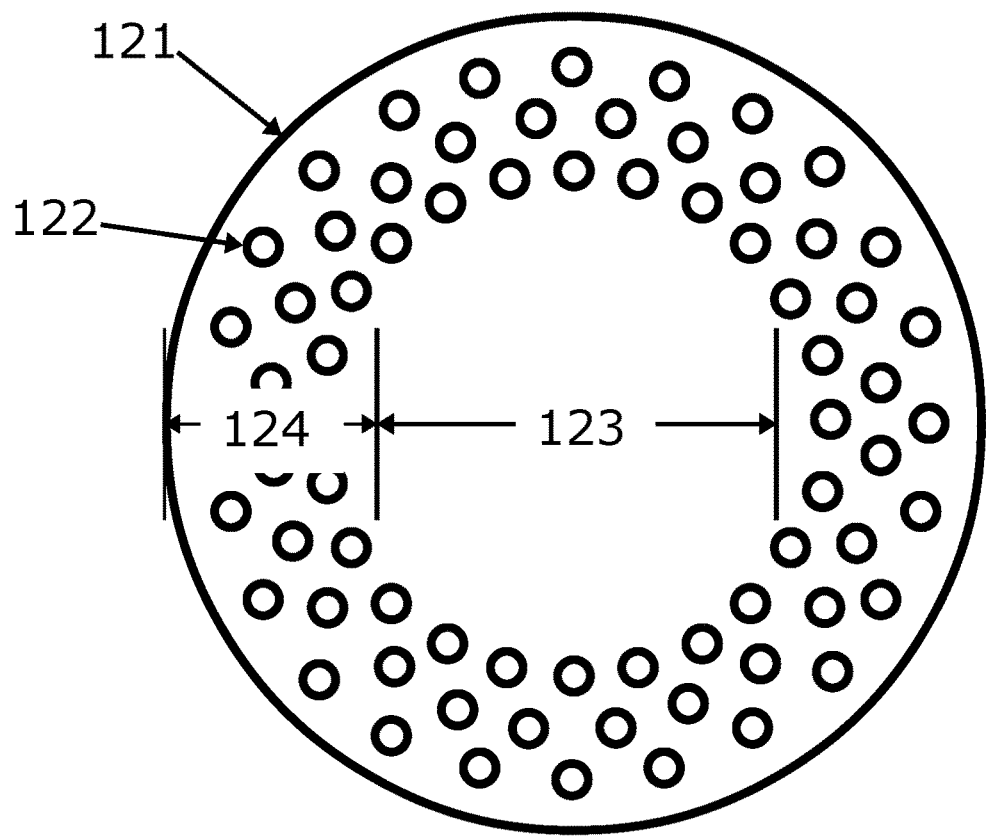
FIG. 3 is a top view of the cap in an embodiment of the present invention.

In a preferred embodiment, outer tube 125, cap 121, and four cap retainers 126, are assembled together to form casing 120 (the top of which is shown in FIG. 2). Outer tube 125 is a hollow cylinder 40 inches in length and constructed out of 8-inch ASTM A500 ANSI Schedule 40 electric resistance welded (ERW) steel pipe. Cap 121 is 8⅜ inches in diameter and is constructed out of ¼-inch ASTM A36 steel. As shown in FIG. 3, inside portion 123 of cap 121 is solid while outside portion 124 comprises 78 ¼-inch cap holes 122 arranged in three rows. Inside portion 123 and outside portion 124 align with inner tube 111, such that air passing through core airflow chamber 114 will be blocked by inside portion 123, and air passing through casing airflow chamber 127 will be allowed to pass through cap holes 122. Cap 121 is secured to outer tube 125 by four cap retainers 126, which are constructed out of ¼-inch ASTM A36 steel, 1 inch wide and 6 inches long, and bent in half at a 90° angle; cap retainers 126 are welded to the top of cap 121 and the outside of outer tube 125.

Figure 4A:
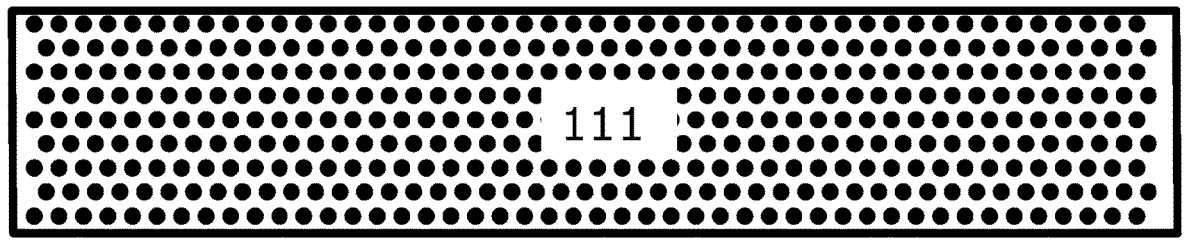
Figure 4B:
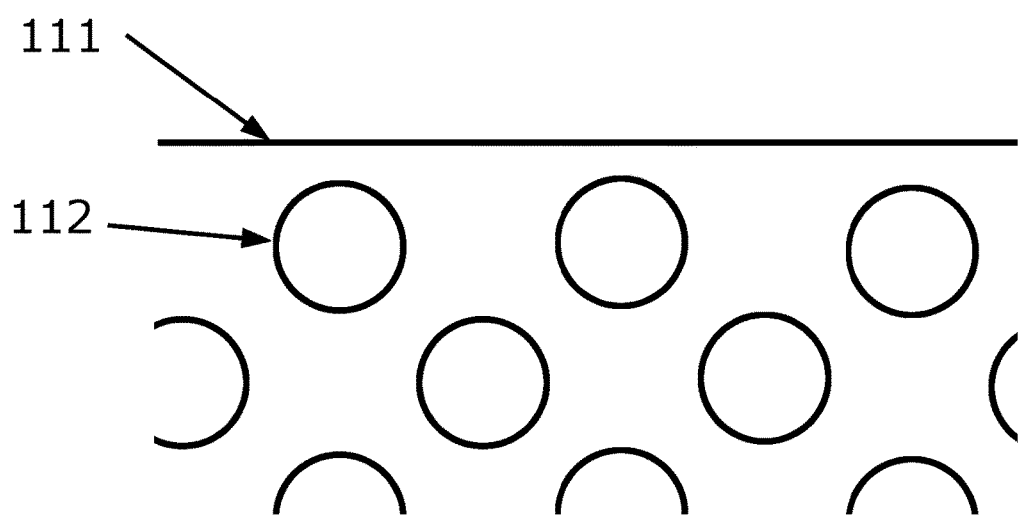
Figure 5:
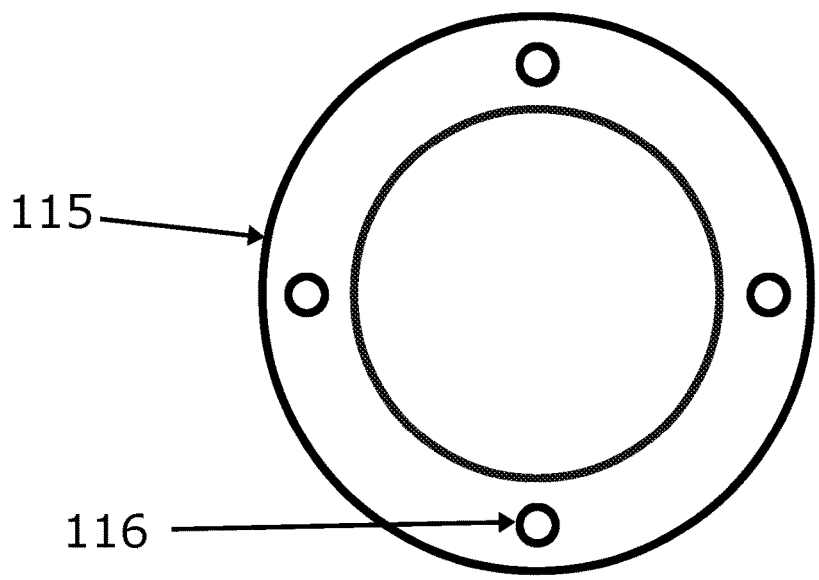
FIG. 5 is a top view of a baffle in an embodiment of the present invention.
Figure 6:
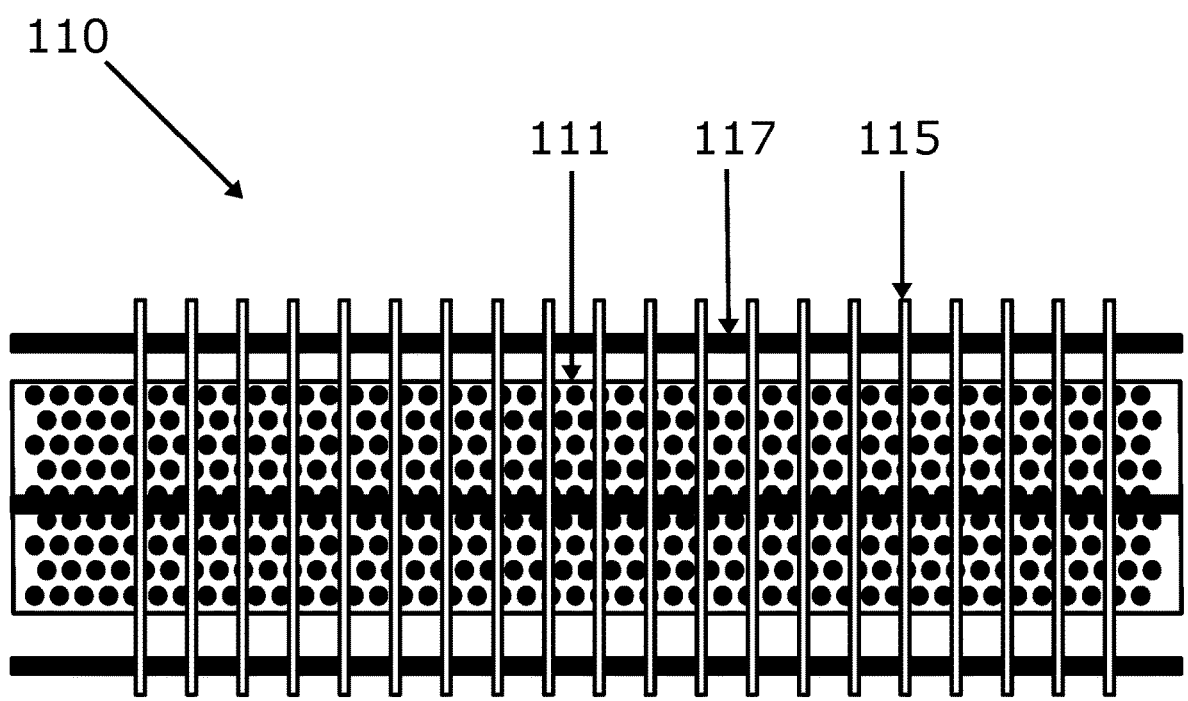
FIG. 6 is an external side view of the assembled core in an embodiment of the present invention.

Inner tube 111 (FIGS. 4a and 4b), support rods 117, and baffles 115 (FIG. 5), are assembled together to form core 110 (FIG. 6). Inner tube 111 is 47 ¾ inches in length and constructed out of 4-inch ASTM A36 11 gauge cold-drawn steel. Inner tube 111 has 920 ⅜-inch tube holes 112 arranged in 92 rows of 10 holes each and distributed evenly on inner tube 111. Each of the 20 baffles 115 are secured to the outer surface of inner tube 111 and to four support rods 117. Each baffle 115 has an inner diameter of 4 1/16 inches and an outer diameter of 7⅜ inches and is constructed out of ⅛-inch ASTM A36 steel. Each baffle 115 has four equally-spaced ½-inch baffle holes 116 through which the four support rods 117 are inserted. Support rods 117 are 47¾ inches in length, ½ inch in diameter, and constructed out of cold-finished 1018 steel. Starting from the top of inner tube 111, each baffle 115 is positioned two inches apart from the adjacent baffle 115, leaving the bottom 4-½ inches of inner tube 111 without any baffles 115. Baffles 115 are welded to secure them to support rods 117 and to inner tube 11.

Figure 7:
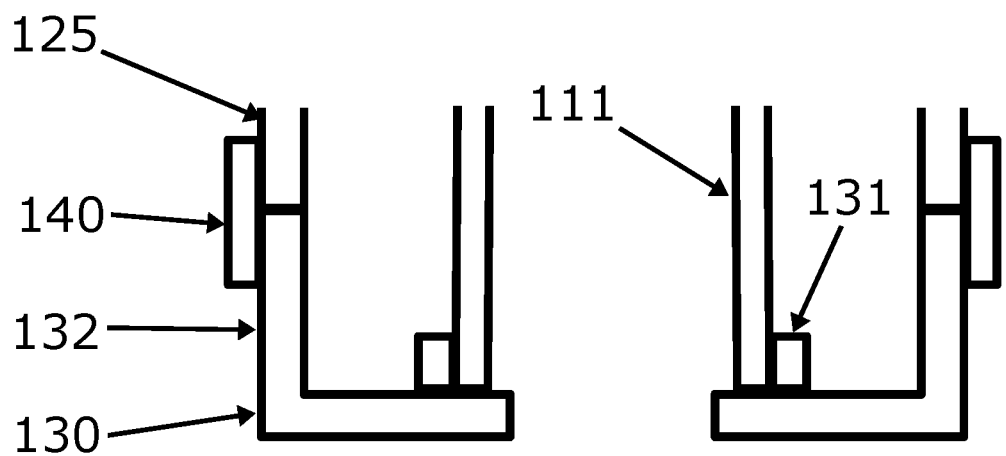
FIG. 7 is a cutaway view of the bottom of the assembled muffler in an embodiment of the present invention.

As shown in FIG. 7, inner tube 111 fits into a corresponding inner ring 131 of base 130 and outer tube 125 mates with a corresponding outer ring 132 of base 130. Outer tube 125 is secured to outer ring 132 using an 8-inch Gruvlock 7401 coupling 140. Base 130 is attached to air dryer 160 (not shown) using mechanisms commonly known in the art.

Other Embodiments and Variations

Those skilled in the art will recognize that the particular features of the preferred embodiment of muffler 100 may be modified without departing from the spirit of the present invention, so long as the resulting muffler 100: (a) provides aerodynamic noise reduction to levels that are within the guidelines promulgated by governmental agencies and private workplace safety organizations and (b) retains its structural integrity through hundreds of thousands of blow down cycles. Selection of some of these variations may affect the quality of the general operation of the present invention in terms of muffling performance and strength. Other variations may be driven by costs of manufacture, availability of materials, dryer size, physical constraints, installation requirements, and other factors which may be independent of the general operation of the present invention. The following variations represent a non-exclusive list of examples of other embodiments which may be mixed and matched as needed and as technically feasible without affecting the general functionality of muffler 100.

Figure 8:
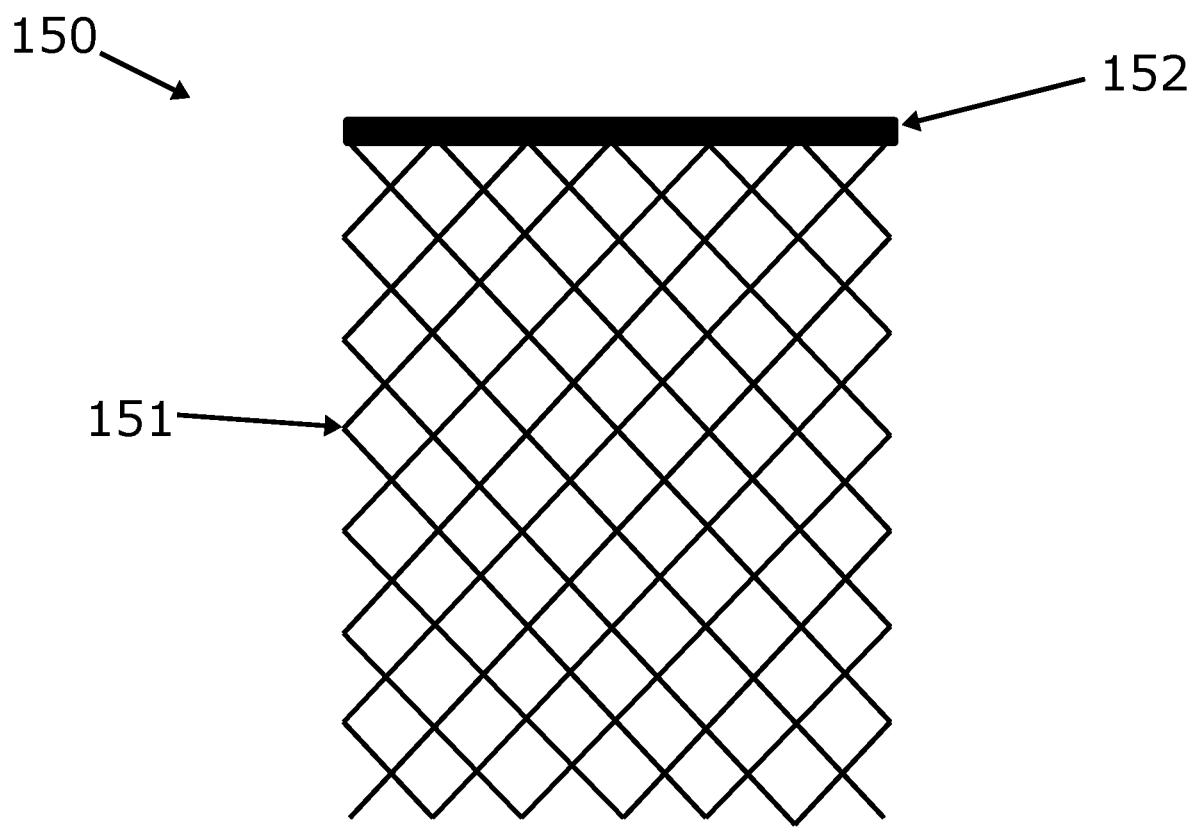
FIG. 8 is a cutaway view of an air deflector in an embodiment of the present invention.

In some embodiments, as shown in FIG. 8, an air diverter 150, comprising a diverter tube 151, constructed for example from #9 expanded metal, and a diverter cap 152, constructed for example from ¼-inch ASTM A36 steel, is secured to the top of muffler 110 using any mechanism commonly known in the art for securing metal components, for example by overlapping diverter tube 151 to the top of outer tube 125 and welding diverter tube 151 to outer tube 125. In operation, air diverter 150 diverts the air flow horizontally as it comes out of muffler 100 to prevent damage to external components, such as a ceiling or roof, which may be positioned above air dryer 160.

In some embodiments, muffler 100 may be shorter or longer in length and be wider or narrower in diameter. For example, a smaller capacity dryer 160 may need less noise muffling capabilities than a larger capacity air dryer 160. In these embodiments, the dimensions of inner tube 111, outer tube 125, and support rods 117 may change accordingly, and the number of baffles 115, cap holes 122, and tube holes 112 may change accordingly.

In some embodiments, muffler 100 may have a general shape other than cylindrical. For example, the configuration of the other components of air dryer 160 may necessitate a generally ovular- or rectangular-shaped tube. In these embodiments, the shapes of inner tube 111, outer tube 125, and baffles 115 may change accordingly.

In some embodiments, the various components may be constructed out of materials other than those specified for the preferred embodiment. For example, other materials may provide better resistance to corrosion, better inherent sound absorption, better workability, or reduced costs of manufacture.

In some embodiments, the size, number, and arrangement of cap holes 122 and tube holes 112 may change, so long as the holes are of sufficient size, number, and arrangement so as to allow the efficient passage of air. For example, for a given blow down air pressure, higher reduction aerodynamic noise may be achieved with a higher number of smaller tube holes 112.

In some embodiments, the various components may be attached to one another using other mechanisms commonly known in the art for securing metal components, so long as the attachment mechanisms do not weaken or loosen over the course of operation.

In some embodiments, cap 121 may be welded directly to outer tube 125 in addition to or instead of attached indirectly through cap retainers 126, and the size, number, and arrangement of cap retainers 126 may be varied or may be omitted entirely so long as cap 121 is adequately secured to outer tube 125.

In some embodiments, support rods 117 may be wider or narrower in diameter, may be rectangular or another shape other than round, and there may be greater or fewer in number than in the preferred embodiment, so long as baffles 115 are securely held in place over the course of operation of muffler 100.

In some embodiments, inner tube 111 may be terminated on one end by a cap that is distinct from cap 121, for example, to provide a better barrier to air flow through core airflow chamber 114. Alternatively, in some embodiments, cap 121 may further comprise a ring or pipe that mates with inner tube 111 to provide a better barrier to air flow through core airflow chamber 114.

In some embodiments, baffles 115 may extend about halfway between inner tube 111 and outer tube 125 to provide space for the flow of air through casing airflow chamber 127. In other embodiments, baffles 115 may extend substantially to the inner surface of outer tube 125 and baffles 115 may each have a plurality of holes to provide space for the flow of air through casing airflow chamber 127.

In some embodiments, core 110 and casing 120 may be secured to base 130 using any mechanism commonly known in the art for securing two pipe sections to one another. For example, core no may further comprise threads which allow core no to be screwed into and out of matching threads on base 130. Further, inner tube of core no may fit on the outside of inner ring 131 rather than inside inner ring 131 as shown in FIG. 7.

In some embodiments, the bottom of cap 121 may include a ring, pipe, or a plurality of support rods which, upon assembly of core no and casing 120, will fit up against the inside or outside of inner tube 111 and provide additional structural integrity.

Figure 9:
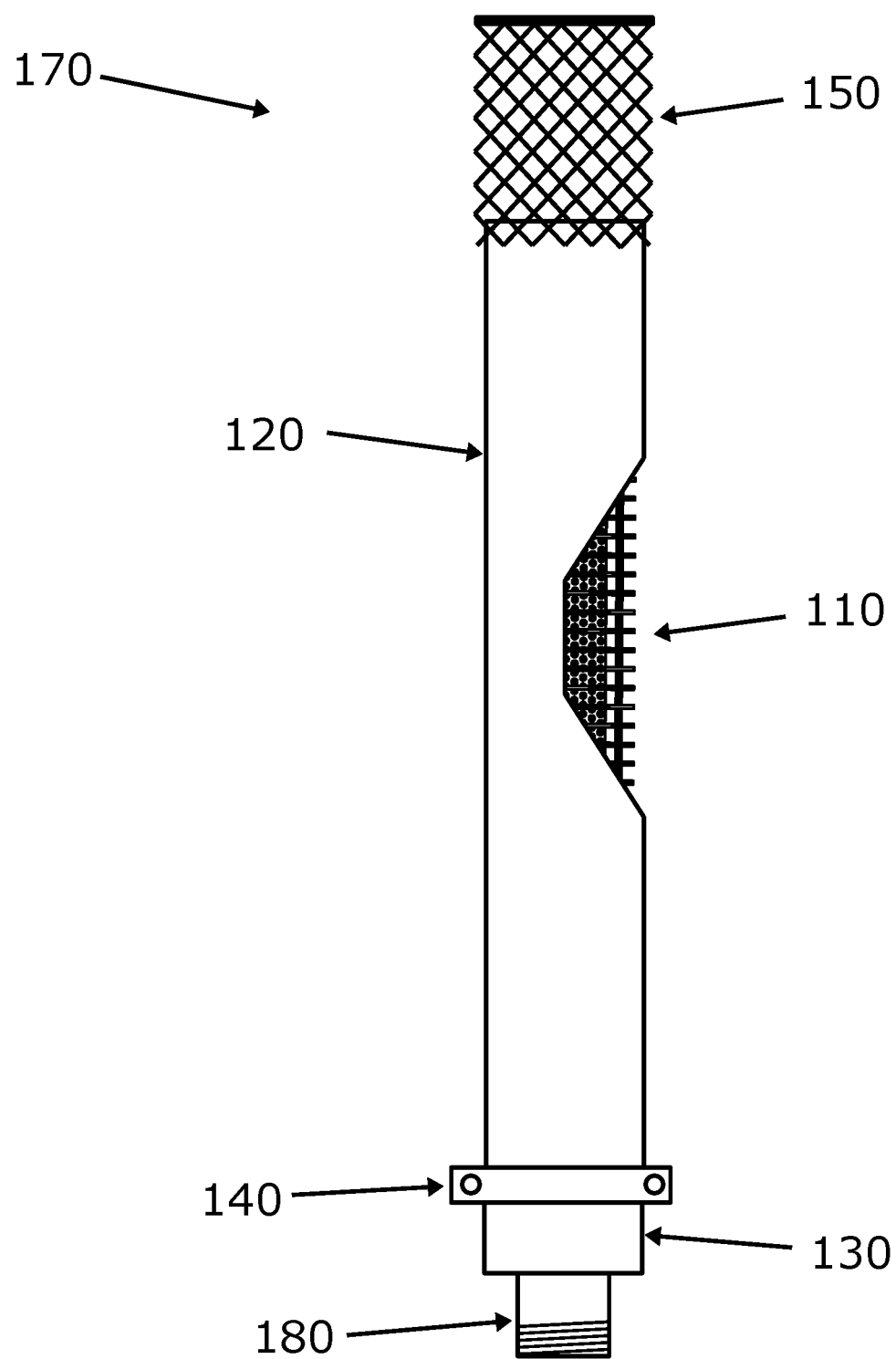
FIG. 9 is a side view of an embodiment of the present invention which incorporates a number of optional features.

In some embodiments, core no, casing 120, and base 130 may be assembled as a muffler unit 170, such that muffler unit 170 can be attached and detached from air dryer 160 (not shown) as a single piece. Muffler unit 170 may further comprise size reducers, inside or outside threaded connector pipes, flanges, adapters, and other mechanisms known in the art for securing metal components to one another. FIG. 9 shows an embodiment of a muffler unit 170 having a deflector 150, casing 120, core no (shown in cutaway form), coupling 140, base 130, and threaded connector pipe 180.

The invention claimed is:

1. An apparatus for reducing aerodynamic noise, the apparatus comprising:
a core comprising:
an inner tube having an outer surface, an inner surface, and a plurality of tube holes passing between the inner surface and the outer surface;
a plurality of baffles; and
a plurality of supporting rods;
where the plurality of baffles are secured to the outer surface of the inner tube and the plurality of supporting rods are secured to the plurality of baffles; and
where the tube holes are not blocked, either in whole or in part, by fiberglass, treated paper, wire mesh, or other packing material; and
a casing comprising:
an outer tube having an outer surface and an inner surface; and
a cap having a top surface and a bottom surface, where the top surface and the bottom surface each have a central portion and a peripheral portion, and where a plurality of cap holes pass through the peripheral portion between the top surface and bottom surface;
where the cap is secured to one end of the outer tube and the other end of the outer tube is open;
where the core fits inside of the casing to form a first airflow chamber bounded by the inner surface of the inner tube and the central portion of the bottom surface of the cap, and a second airflow chamber bounded by the outer surface of the inner tube, the inner surface of the outer tube, and the peripheral portion of the bottom surface of the cap; and
where the core and casing are configured to mate with a base such that air may enter through an opening in the base into the first airflow chamber and such that air is blocked from traveling out of the second airflow chamber by the base.

2. The apparatus of claim 1, the casing further comprising:
a plurality of cap retainers securing the cap to the outer tube.

3. The apparatus of claim 1, further comprising:
an air deflector comprising:
a solid diverter cap; and
a partially-open diverter tube;
where the diverter cap is secured to one end of the diverter tube; and
where the other end of the diverter tube is secured to the outer tube.

4. The apparatus of claim 1:
where the components comprising the core and casing are constructed using steel; and
where the components that are secured to one another are secured using welding.

5. The apparatus of claim 1:
where there are at least 50 cap holes;
where there are at least 15 baffles; and
where there are at least 500 tube holes.

6. The apparatus of claim 1:
where inner tube is about 48 inches in length and about 4 inches in diameter; and
where outer tube is about 40 inches in length and about 8 inches in diameter.

7. The apparatus of claim 1:
where the inner tube and outer tube are substantially cylindrical; and
where the baffles and cap are substantially circular.

8. An apparatus for reducing aerodynamic noise, the apparatus comprising:
a core comprising:
an inner tube having an outer surface, an inner surface, and a plurality of tube holes passing between the inner surface and the outer surface;
a plurality of baffles; and
a plurality of supporting rods;
where the plurality of baffles are secured to the outer surface of the inner tube and the plurality of supporting rods are secured to the plurality of baffles; and
where the tube holes are not blocked, either in whole or in part, by fiberglass, treated paper, wire mesh, or other packing material;
a casing comprising:
an outer tube having an outer surface and an inner surface; and
a cap having a top surface and a bottom surface, where the top surface and the bottom surface each have a central portion and a peripheral portion, and where a plurality of cap holes pass through the peripheral portion between the top surface and bottom surface;
where the cap is secured to one end of the outer tube and the other end of the outer tube is open; and a base comprising:
  a planar bottom having an open inner portion and a closed outer portion;
  an inner pipe secured to the planar bottom and orthogonally positioned around the perimeter of the open inner portion;
  an outer pipe secured to the planar bottom and orthogonally positioned around the perimeter of the closed outer portion;
where the core fits inside of the casing to form a first airflow chamber bounded by the inner surface of the inner tube, the central portion of the bottom surface of the cap, and the open inner portion of the base, and a second airflow chamber bounded by the outer surface of the inner tube, the inner surface of the outer tube, the peripheral portion of the bottom surface of the cap, and the outer portion of the base.

9. The apparatus of claim 8, the casing further comprising:
a plurality of cap retainers securing the cap to the outer tube.

10. The apparatus of claim 8, further comprising:
an air deflector comprising:
  a solid diverter cap; and
  a partially-open diverter tube;
  where the diverter cap is secured to the top of the diverter tube; and
  where the bottom of the diverter tube is secured to the top of the outer tube.

11. The apparatus of claim 8:
where the components comprising the core and casing are constructed using steel; and
where the components that are secured to one another are secured using welding.

12. The apparatus of claim 8:
where there are at least 50 cap holes;
where there are at least 15 baffles; and
where there are at least 500 tube holes.

13. The apparatus of claim 8:
where inner tube is about 48 inches in length and about 4 inches in diameter; and
where outer tube is about 40 inches in length and about 8 inches in diameter.

14. The apparatus of claim 8:
where the inner tube and outer tube are substantially cylindrical; and
where the baffles, cap, and base are substantially circular.

15. The apparatus of claim 8, the base further comprising:
a connector pipe extending away from the core and casing, where the connector pipe is configured to mate with an exhaust pipe from an air dryer.

16. The apparatus of claim 15, where the connector pipe comprises:
threads configured to mate with corresponding threads on the exhaust pipe.

17. The apparatus of claim 15:
where the connector pipe is a different size than the exhaust pipe; and
where the connector pipe comprises an adapter configured to allow the connector pipe to mate with the exhaust pipe.

* * * * *